United States Patent
Ianev et al.

(10) Patent No.: US 10,212,628 B2
(45) Date of Patent: *Feb. 19, 2019

(54) INTERSYSTEM CHANGE BETWEEN DIFFERENT RADIO ACCESS NETWORKS

(71) Applicant: NEC CORPORATION, Tokyo (JP)

(72) Inventors: Iskren Ianev, Berkshire (GB); Yannick Lair, Berkshire (GB); Kouhei Gotou, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/893,296

(22) Filed: Feb. 9, 2018

(65) Prior Publication Data
US 2018/0167852 A1 Jun. 14, 2018

Related U.S. Application Data

(63) Continuation of application No. 15/369,368, filed on Dec. 5, 2016, now Pat. No. 9,924,415, which is a
(Continued)

(30) Foreign Application Priority Data

Mar. 30, 2012 (GB) .................................. 1205827.7

(51) Int. Cl.
*H04W 72/00* (2009.01)
*H04W 36/00* (2009.01)
(Continued)

(52) U.S. Cl.
CPC ... *H04W 36/0022* (2013.01); *H04W 36/0016* (2013.01); *H04W 36/0061* (2013.01);
(Continued)

(58) Field of Classification Search
CPC . H04W 36/14; H04W 36/0061; H04W 88/06; H04W 76/025; H04W 60/005
(Continued)

(56) References Cited

U.S. PATENT DOCUMENTS

2007/0281699 A1 12/2007 Rasanen
2011/0021216 A1 1/2011 Pudney et al.
(Continued)

FOREIGN PATENT DOCUMENTS

CN 102083047 A 6/2011
EP 2214444 A1 8/2010
(Continued)

OTHER PUBLICATIONS

Nokia Corporation, Nokia Siemens Networks, "NAS DL Count in MobilityFromEUTRACommand" [online], GPP TSG-RAN WG2 Meeting #64 R2-086254, Internet <URL://http://www.3gpp.org/ftp/tsgran/WG2 R L2/TSGR2 64/Docs/R2-Q86254.zit)>. Nov. 10-14, 2008 (5 pages total).
(Continued)

*Primary Examiner* — Charles T Shedrick
(74) *Attorney, Agent, or Firm* — Sughrue Mion, PLLC

(57) ABSTRACT

A wireless terminal can communicate with two radio access networks (RAN) (304, 306) of different types. The wireless terminal can register simultaneously with a RAN of the first type and a RAN of the second type and can wirelessly connect to a RAN of either the first type or the second type in a connected state. The wireless terminal when registered with both a first RAN and a second RAN and when wirelessly connected to the first RAN in the connected state, receives a mobility signal via the first RAN indicating a RAN of the second type and, in response to receiving the mobility signal and in response to being so registered with the first RAN and second RAN, transmits an access trigger
(Continued)

signal (417). The access trigger signal indicates that the wireless terminal is to be connected to the second RAN in the connected state.

10 Claims, 5 Drawing Sheets

Related U.S. Application Data continuation of application No. 14/388,855, filed as application No. PCT/JP2013/058886 on Mar. 15, 2013, now Pat. No. 9,549,384.

(51) Int. Cl.
  *H04W 88/06* (2009.01)
  *H04W 60/00* (2009.01)
  *H04W 76/15* (2018.01)
  *H04W 36/14* (2009.01)

(52) U.S. Cl.
  CPC ......... *H04W 60/005* (2013.01); *H04W 76/15* (2018.02); *H04W 88/06* (2013.01); *H04W 36/14* (2013.01)

(58) Field of Classification Search
  USPC .................. 455/436–444, 452.1; 370/331
  See application file for complete search history.

(56) References Cited

U.S. PATENT DOCUMENTS

| | | |
|---|---|---|
| 2011/0090848 A1 | 4/2011 | Kim et al. |
| 2011/0177812 A1 | 7/2011 | Tanabe et al. |
| 2011/0275371 A1 | 11/2011 | Roger |
| 2012/0076121 A1 | 3/2012 | Choi et al. |
| 2012/0157093 A1 | 6/2012 | Zhu et al. |
| 2013/0157661 A1 | 6/2013 | Bhaskaran et al. |

FOREIGN PATENT DOCUMENTS

| | | |
|---|---|---|
| EP | 2249608 A1 | 11/2010 |
| EP | 2302844 A1 | 3/2011 |
| EP | 2381720 A2 | 10/2011 |
| JP | 2010-010849 A | 1/2010 |
| JP | 2010-093455 A | 4/2010 |
| JP | 2011-527537 A | 10/2011 |
| JP | 2012-516583 A | 7/2012 |
| JP | 2013-503506 A | 1/2013 |
| WO | 2009/058220 A1 | 5/2009 |
| WO | 2009/113782 A2 | 9/2009 |
| WO | 2010/146467 A1 | 12/2010 |
| WO | 2011/022896 A1 | 3/2011 |
| WO | 2011/052994 A2 | 5/2011 |
| WO | 2011/119680 A2 | 9/2011 |
| WO | 2011/136053 A1 | 11/2011 |

OTHER PUBLICATIONS

NEC, ISR deactivation in Cell Change Order (CCO) to GERAN[online], 3GPP TSG SA WG2 Meeting #90 S2-121248, Internet <URL:http://www.3gpp.org/ftp/tsg sa/WG2 Arch/TSGS2 90 Bratislava/Docs/S2-121248.zip>. Apr. 16-20, 2012 (4 pages total).
Communication dated Mar. 28, 2017 issued by the Japanese Patent Office in counterpart application No. 2014-547587.
Communication dated Nov. 20, 2015 from the European Patent Office issued in corresponding Application No. 13769057.4.
NEC, "RA update after Cell Change Order (CCO) to GERAN", 3GPP TSG SA WG2 Meeting #92, TD S2-123292, Barcelona, Spain, Jul. 9-1, 2012, 3 pages total.
NTT DOCOMO, Ericsson, ST-Ericsson, "Clarification of LAU/RAU trigger for CSFB UE when ISR is activated". 3GPP TSG-SA WG2 Meeting #89, S2-120917, Vancouver, Canada, Feb. 14-18, 2012, 9 pages total.
SG Office Action dated Oct. 1, 2015; Application No. 11201406106T.
CA Office Action dated Sep. 2, 2015; Application No. 2,869,797.
International Search Report—PCT/JP2013/058886—dated Apr. 23, 2013.
3GPP TS 23.401 V9.0.0—3rd Generation Partnership Project;Technical Specification Group Services and System Aspects;General Packet Radio Service (GPRS) enhancements for Evolved Universal Terrestrial Radio Access Network (E-UTRAN) access (Release 9)—Mar. 2009—pp. 1-225.
British Search and Examination Report—GB1205827.7—dated Aug. 17, 2012.
Decision to Grant a Patent dated Jun. 26, 2018 issued by the Japanese Patent Office in counterpart application No. 2017-197394.
Communication dated Sep. 13, 2018 from the European Patent Office in counterpart application No. 18182055.6.
3GPP TS 23.401 V11.1.0—3rd Generation Partnership Project; Technical Specification Group Services and System Aspects; General Packet Radio Service (GPRS) enhancements for Evolved Universal Terrestrial Radio Access Network (E-UTRAN) access (Release 11)—Mar. 2012—pp. 1-284.
NEC, "ISR deactivation in Cell Change Order (CCO) to Geran", 3GPP TSG SA WG2 Meeting #92 TD S2-122779, Barcelona, Spain, Jul. 9-13, 2012 (5 pages total).

INTERSYSTEM CHANGE BETWEEN DIFFERENT RADIO ACCESS NETWORKS

CROSS-REFERENCE TO RELATED APPLICATIONS

This application is a Continuation of U.S. application Ser. No. 15/369,368 filed Dec. 5, 2016, which is a Continuation of U.S. application Ser. No. 14/388,855 filed Sep. 29, 2014, which is a National Stage of International Application of Application No. PCT/JP2013/058886 filed Mar. 15, 2013, which claims priority from United Kingdom Application No. 1205827.7 filed Mar. 30, 2012, the disclosures of which are incorporated herein in their entireties.

TECHNICAL FIELD

The invention relates to intersystem change and in particular to an improved intersystem change of a wireless terminal between different radio access networks.

BACKGROUND ART

Radio access networks (RANs) of different wireless cellular communication systems operate according to various different defined sets of standards each having different respective radio access technologies (RAT). Wireless terminals operated by users of such systems are usually configured so that they can operate with more than one such radio access network. Therefore it is often required that a terminal must be able to connect to more than one type of network operating according to different respective standards, and must be able to switch dynamically between such different networks. Such a switching process is often termed an inter-RAT 'handover'.

GSM (Global System for Mobile Communications, originally Groupe Special Mobile), is a set of standards developed by the European Telecommunications Standards Institute (ETSI) to define technologies for so-called second generation (2G) digital cellular networks. Developed as a replacement for first generation (1G) analog cellular networks, the GSM standard originally described a digital, circuit switched network optimized for full duplex voice telephony. The standard was expanded over time to include first circuit switched data transport, then packet data transport via GPRS (General Packet Radio Services).

Enhanced Data rates for GSM Evolution (EDGE) (also known as Enhanced GPRS (EGPRS)) is a digital mobile telephone technology that is a backward-compatible extension of GSM and allows improved data transmission rates. EDGE is considered a pre-third generation (3G) radio technology and was deployed on GSM networks beginning in 2003. EDGE is standardized by the international organisation known as 3GPP (3rd Generation Partnership Project) as part of the GSM family. A network that operates according to the GSM and/or EDGE standards is known as a GSM/EDGE radio access network (GERAN).

Universal Mobile Telecommunications System (UMTS) is a third generation mobile cellular technology for communication networks based on the GSM standard. Developed by 3GPP, UMTS is a component of a set of standards specified and maintained by the International Telecommunications Union (ITU), this set of standards known as IMT-2000. IMT-2000 is comparable to, but different from, the CDMA2000 set of standards for networks based on the competing cdmaOne™ technology deployed in the USA and internationally elsewhere.

UMTS employs Wideband Code Division Multiple Access (W-CDMA) radio access technology to offer greater spectral efficiency and bandwidth. UMTS specifies a complete network system, covering the radio access network (UMTS Terrestrial Radio Access Network, or UTRAN), the core network (Mobile Application Part, or MAP) and the authentication of users via SIM cards (Subscriber Identity Module).

UMTS and GSM/EDGE can share a Core Network (CN), making UTRAN an alternative radio access network to GERAN, and allowing (mostly) transparent switching between these radio access networks (RANs) according to available coverage and service needs. Because of that, UMTS and GSM/EDGE radio access networks are sometimes collectively referred to as UTRAN/GERAN. Most cells of European mobile cellular communication systems, and most handsets or mobile terminals used in such networks, can support both UTRAN and GERAN operation.

Since 2006, UMTS networks in many countries have been or are in the process of being upgraded with High Speed Downlink Packet Access (HSDPA), sometimes known as 3.5G. Currently, HSDPA enables downlink transfer speeds of up to 21 Mbit/s. Work is also progressing on improving the uplink transfer speed with the High-Speed Uplink Packet Access (HSUPA). Longer term, the 3GPP Long Term Evolution (LTE™) set of standards, termed fourth generation (4G), aims to provide data transfer rates of 100 Mbit/s on the downlink and 50 Mbit/s on the uplink, using a 4G air interface technology based upon orthogonal frequency-division multiplexing (OFDM).

E-UTRAN is an abbreviation for evolved UMTS Terrestrial Radio Access Network.

E-UTRAN or eUTRAN is the radio access network defined by the LTE™ standards.

E-UTRAN uses a simplified single node architecture consisting of eNBs (E-UTRAN Node B)—see FIG. 1.

Referring to FIGS. 1 and 2, an eNB 102 communicates with an Evolved Packet Core (EPC) 202 using an S1 interface 104. Specifically the eNB 102 communicates with a MME (Mobility Management Entity) node 106, 206 and a UPE (User Plane Entity) node identified here as a S-GW (Serving Gateway) 108, 208 using S1-C and S1-U interfaces 104 for control plane and user plane respectively. The MME node 106, 206 and the UPE node 108, 208 are preferably implemented as separate network nodes so as to allow independent scaling of the control and user plane. Also any eNB can communicate with other eNBs using an X2 interface (X2-C and X2-U for control and user plane respectively). eNBs transmit signals to, and receive signals from, wireless terminals or 'user equipments (UEs). Thus a wireless terminal can be connected to the MME via a eNB.

A HSS (Home Subscriber Server) (not shown) is a central database that contains user-related and subscription-related information. Functions of the HSS include mobility management, call and session establishment support, user authentication and access authorization.

The MME (Mobility Management Entity) is the key control-node for the E-UTRAN access network. It is responsible for idle mode UE (User Equipment) tracking and paging procedures including retransmissions. It is involved in bearer activation/deactivation processes and is also responsible for choosing the serving gateway (S-GW) for a UE when the UE initially attaches to the network and during intra-E-UTRAN handover involving Core Network (CN) node relocation. It is responsible for authenticating the user (by interacting with the HSS).

Non Access Stratum (NAS) signalling terminates at the MME and the MME is responsible for generation and allocation of temporary identities to UEs. The MME checks the authorization of the UE to register with the service provider's Public Land Mobile Network (PLMN) and enforces UE roaming restrictions. The MME also provides the control plane function for mobility between LTE and UTRAN/GERAN access networks with the S3 interface terminating at the MME from the SGSN of the UTRAN/GERAN network.

The Serving GPRS Support Node (SGSN) of a UTRAN/GERAN network has a similar overall function to that of the MME of the E-UTRAN network. The SGSN is responsible for the delivery of data packets from and to the wireless terminals ('mobile stations') within its geographical service area. Its tasks include packet routing and transfer, mobility management (attach/detach and location management), logical link management, and authentication and charging functions. The location register of the SGSN stores location information (e.g., current cell, current visitor location register, VLR) and user profiles (e.g., IMSI, address(es) used in the packet data network) of all GPRS users registered with the SGSN.

Among other functions, the SGSN performs functions associated with mobility management required when a wireless terminal in standby mode moves from one Routing Area (RA) to another Routing Area.

E-UTRAN specifies an Idle mode Signaling Reduction (ISR) function which provides a mechanism to limit or reduce signaling in idle mode during any inter-RAT cell-reselection between E-UTRAN and UTRAN/GERAN. According to this mechanism a wireless terminal (User Equipment, UE) in idle mode, when ISR is activated, is registered with both the MME of the E-UTRAN and the SGSN of a UTRAN/GERAN (see 3GPP TS23.401, Annex J1). Both the SGSN and the MME have a control connection with the serving gateway (S-GW). The MME and SGSN are both registered at the HSS. The UE receives and stores mobility management (MM) parameters provided to the UE by the SGSN (e.g. P-TMSI and RA) and provided to the UE by the MME (e.g. GUTI and TA(s)) and the UE stores session management (bearer) contexts that are common to E-UTRAN and GERAN/UTRAN accesses.

Using these stored parameters and contexts, the UE when it is in idle state can reselect between E-UTRAN and GERAN/UTRAN radio access cells when the UE is within the registered radio access routing areas (RAs) and tracking areas (TAs) without any need to perform any tracking area update (TAU) or radio access update (RAU) procedures by interacting with the network.

CITATION LIST

Non Patent Literature

NPL 1: 3GPP TS 23.401 V9.0.0 (2009-03)

SUMMARY OF INVENTION

Technical Problem

Situations sometimes occur which cause unsynchronized state information in one or more of the UE, MME and SGSN (see 3GPP TS23.401, annex J6). There are no ISR-specific procedures that could handle such special situations and could thereby avoid additional complexity and error cases. All such special situations that would cause context in the UE, MME and SGSN to become asynchronous are handled by de-activation of the ISR function. The de-activation of the ISR function involves de-registering the UE from the RAN other than the RAN to which the UE is connected in connected mode. The known RAU and/or TAU procedures then serve to synchronize contexts between the MME and the SGSN and, when the synchronization is done, the ISR function is activated again when desired by the network.

Another situation which causes a problem during an inter-RAT handover has not been appreciated until now, and is illustrated in FIG. 3.

FIG. 3. is an event diagram showing operations (represented by boxes) performed by entities (wireless terminal 302 for example a mobile terminal, E-UTRAN MME 304 and GERAN SGSN 306) wherein time is represented by a downward vertical direction (not to scale). One or more signals between entities are represented by horizontal arrows. In this example only one signal is shown and only operations performed by the wireless terminal are shown.

In box 310, the wireless terminal 302 is connected to the E-UTRAN MME by means of signalling that takes place between the wireless terminal and the E-UTRAN MME. As a result of this connection, the wireless terminal is in a connected state in which the wireless terminal can transmit and receive traffic data via the E-UTRAN. The wireless terminal is considered to be in E-UTRAN connected mode. ISR is active or activated i.e. ON in the wireless terminal and therefore the wireless terminal is registered with both the E-UTRAN and the GERAN, the registration of the wireless terminal being associated with a registration area (Tracking Area, TA) by the E-UTRAN and also being associated with a registration area (Routing Area, RA) by the GERAN. The GERAN associates the wireless terminal with a registration area/routing area 'RA'.

As indicated by arrow 312, the wireless terminal receives a signal comprising an indication in the form of a message termed 'Mobility from E-UTRAN Command' having a 'purpose' parameter set to 'Cell Change Order' (CCO) and a target RAT type set to GERAN as specified in 3GPP TS36.331, s5.4.3.3. The message also indicates a target GERAN cell (this being located within routing area RA1).

In box 314, the wireless terminal starts the indicated CCO procedure and also starts a designated timer T3174 for CCO completion control and the terminal performs a reselection which serves to re-select the terminal to the target GERAN cell using the information provided in the 'Mobility from E-UTRAN Command' message. In this situation, the target GERAN cell is within the same RA1 with which the wireless terminal is associated by its registration (that is, the target GERAN cell is within the same routing area RA1 with which the wireless terminal is effectively already registered).

Because of this, and because ISR is ON, and if there is no pending uplink data in the mobile terminal, there is no trigger for access to the GERAN cell (for example, a Routing Area Update request message). Such a trigger is required for a successful completion of the CCO procedure as specified in 3GPP TS44.060, s8.4.1. This represents a problem.

In box 316, the timer T3174 expires and in box 318, the CCO procedure fails.

The present invention seeks to address the problem represented by the above-described CCO-to-GERAN failure when the mobile terminal is in E-UTRAN connected mode, ISR is ON and the RA is not changed, and seeks to provide a more robust and reliable intra-cell handover between different radio access networks.

Solution to Problem

According to the invention there is provided a wireless terminal as claimed in Claim 1.

The claimed subject matter provides a more robust and reliable inter-cell inter-RAT handover between different radio access networks and is well suited for use in the performing of an inter-RAT handover between a E_UTRAN network and a UTRAN or GERAN network.

Embodiments will now be described, by way of example only, with reference to the accompanying drawings.

Advantageous Effects of Invention

The present invention can provide to address the problem represented by the above-described CCO-to-GERAN failure when the mobile terminal is in E-UTRAN connected mode, ISR is ON and the RA is not changed, and provide a more robust and reliable intra-cell handover between different radio access networks.

DESCRIPTION OF EMBODIMENTS

Figure 1:
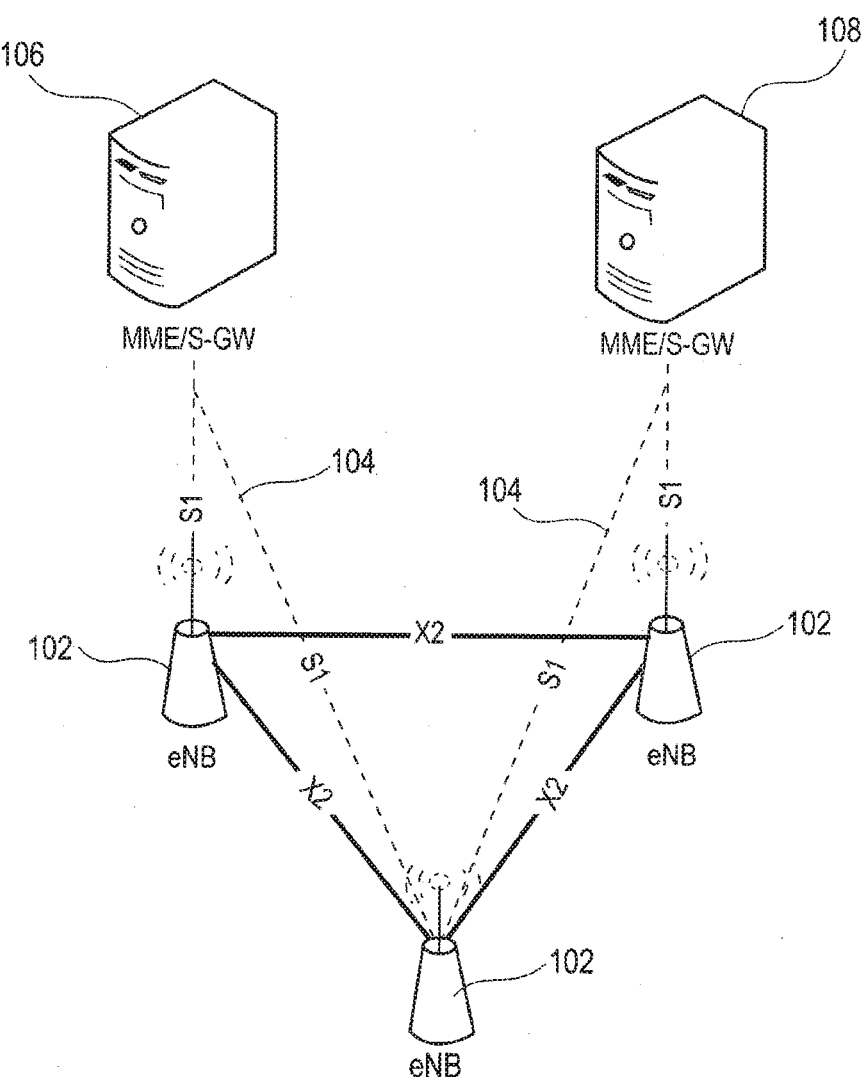
FIG. 1 is a simplified representation of a node architecture of an E-UTRAN network.
Figure 2:
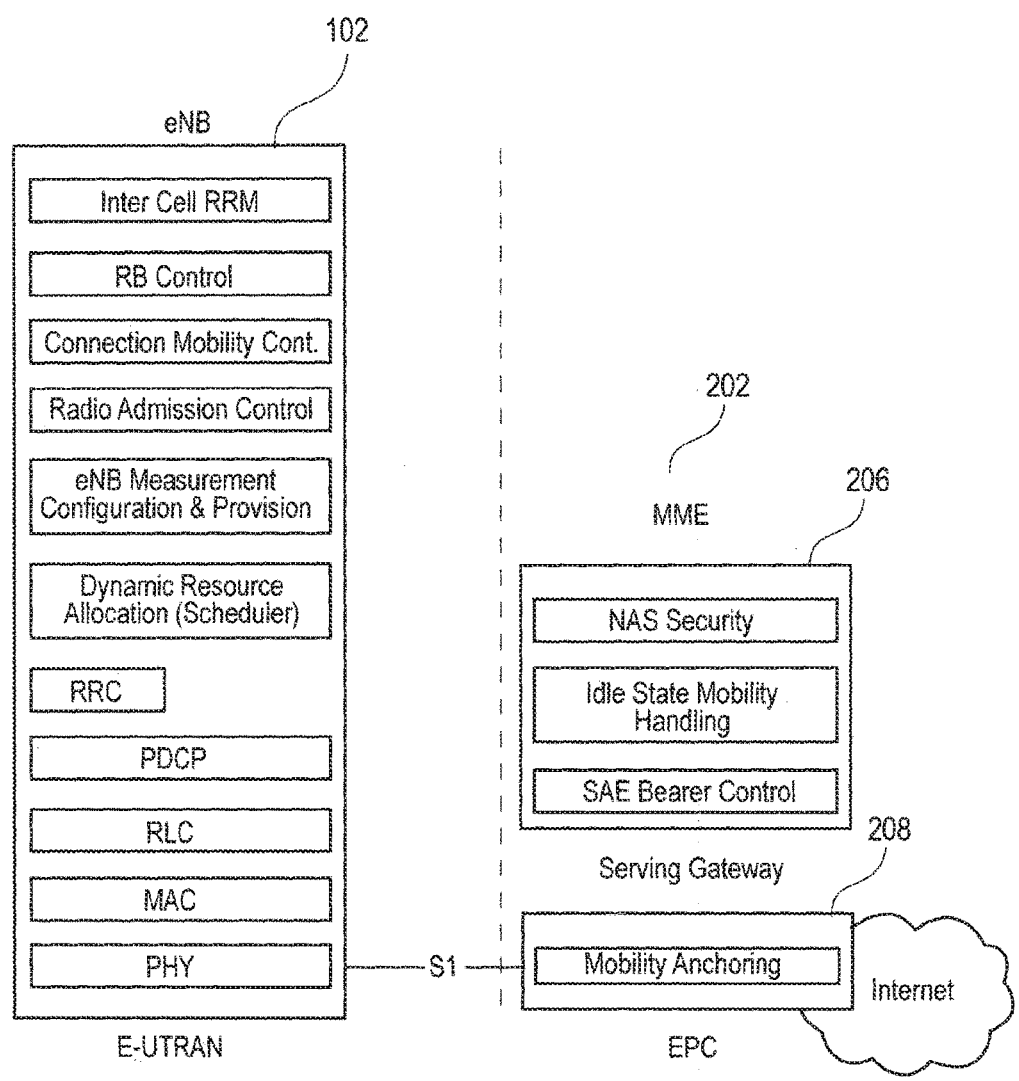
FIG. 2 is a simplified representation of various elements of an E-UTRAN network.
Figure 3:
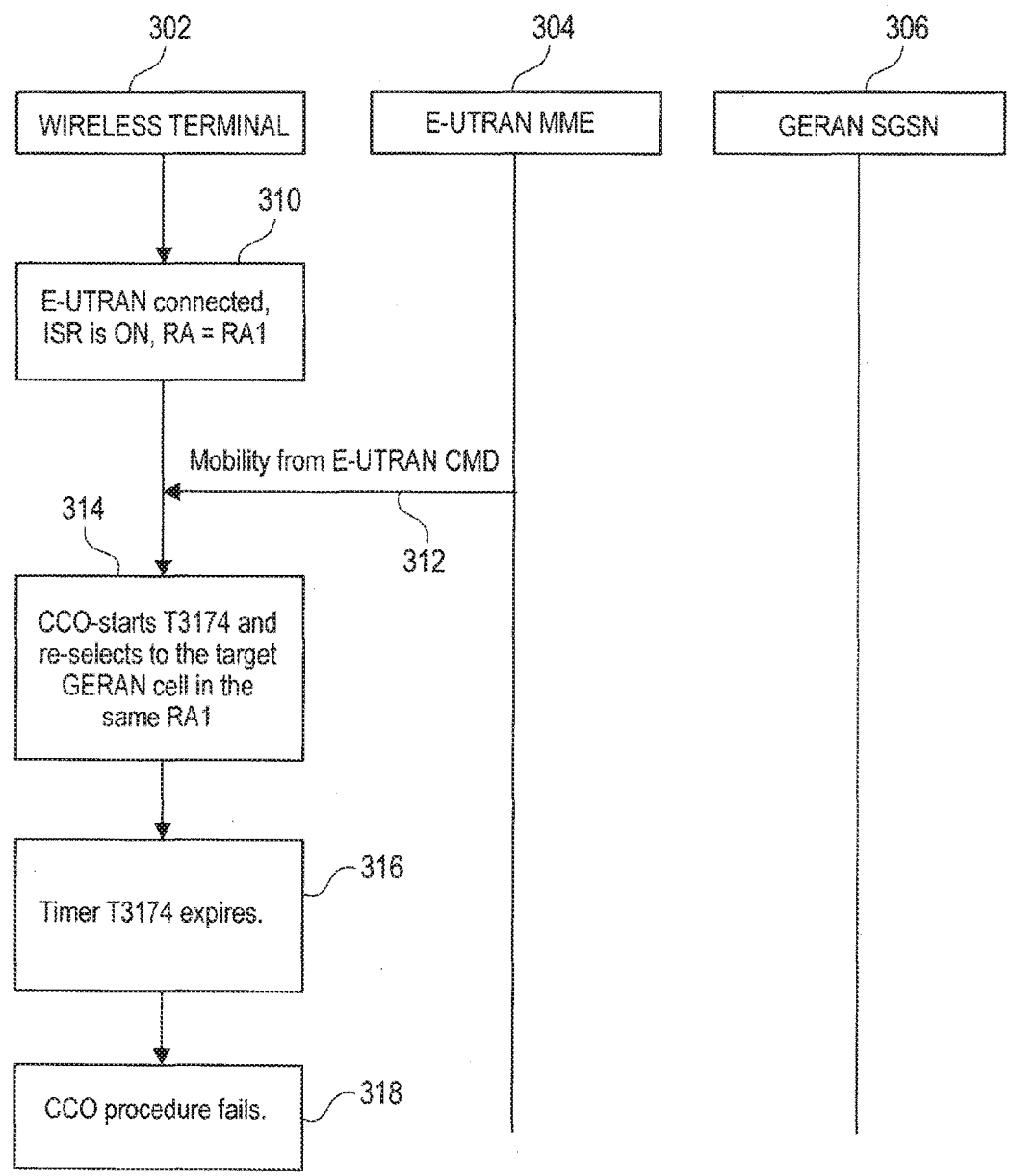
FIG. 3 is an event diagram showing operations performed by entities of an E-UTRAN network according to current state of the art.
Figure 4:
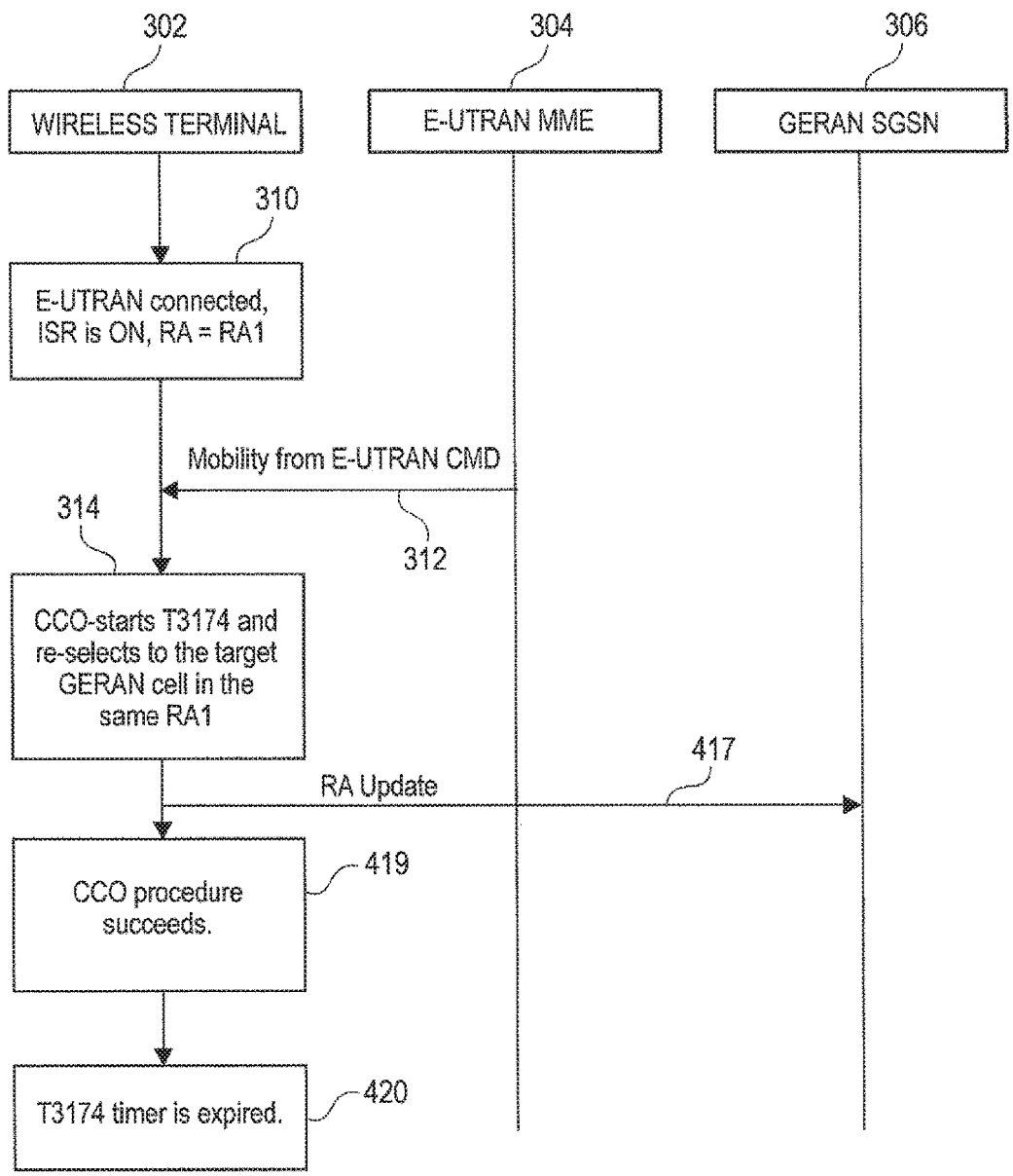
FIG. 4 is an event diagram showing operations performed by entities of an E-UTRAN network according to an embodiment.

Turning to FIG. 4, an event diagram shows operations (represented by boxes) performed by entities (wireless terminal 302 for example a mobile terminal, E-UTRAN MME 304 and GERAN SGSN 306) wherein time is represented by a downward vertical direction (not to scale). One or more signals between entities are represented by horizontal arrows. In this example only one signal is shown and only operations performed by the wireless terminal are shown.

In box 310, the wireless terminal 302 is connected to the E-UTRAN MME by means of signalling that takes place between the wireless terminal and the E-UTRAN MME. As a result of this connection, the wireless terminal is in a connected state in which the wireless terminal can transmit and receive traffic data via the E-UTRAN to which it is connected. The wireless terminal considered to be in connected mode. ISR is active or activated i.e. ON in the wireless terminal and therefore the wireless terminal is registered with both the E-UTRAN and the GERAN, the registration of the wireless terminal being associated with a registration area by the E-UTRAN and also being associated with a registration area by the GERAN. The GERAN associates the wireless terminal with a registration area 'RA1'.

As indicated by arrow 312, the wireless terminal receives a signal comprising an indication in the form of a message termed 'Mobility from E-UTRAN Command' having a 'purpose' parameter set to 'Cell Change Order' (CCO) and a target RAT type set to GERAN as specified in 3GPP TS36.331, s5.4.3.3. The message also indicates a target GERAN cell or RA (this being located within RA1).

In box 314, the wireless terminal starts the indicated CCO procedure and also starts a designated timer T3174 for CCO completion control and the terminal performs a reselection which serves to re-select the terminal to the target GERAN cell using the information provided in the 'Mobility from E-UTRAN Command' message. In this situation, the target GERAN cell is within the same RA1 with which the wireless terminal is associated by its registration (that is, the target GERAN cell is within the same routing area RA1 with which the wireless terminal is effectively registered).

As indicated by arrow 417, the wireless terminal then triggers a routing area update (RAU) as soon as it 'camps' successfully on the target GERAN cell.

The wireless terminal can trigger RA update regardless of any pending uplink data or request. Alternatively the wireless terminal triggers RA update provided that the registered RA is not changed (during the intersystem change from E-UTRAN to GERAN) and there is no pending uplink data or request.

In box 419, the CCO is successfully completed as the RAU by the mobile terminal completes the CCO procedure according to the requirements specified in TS44.060, s 8.4.1 which says:

"The mobile station shall regard the network controlled cell reselection procedure as successfully completed when it has performed access and successfully completed contention resolution in the new cell."

In box 420, the wireless terminal then stops the timer T3174.

Figure 5:
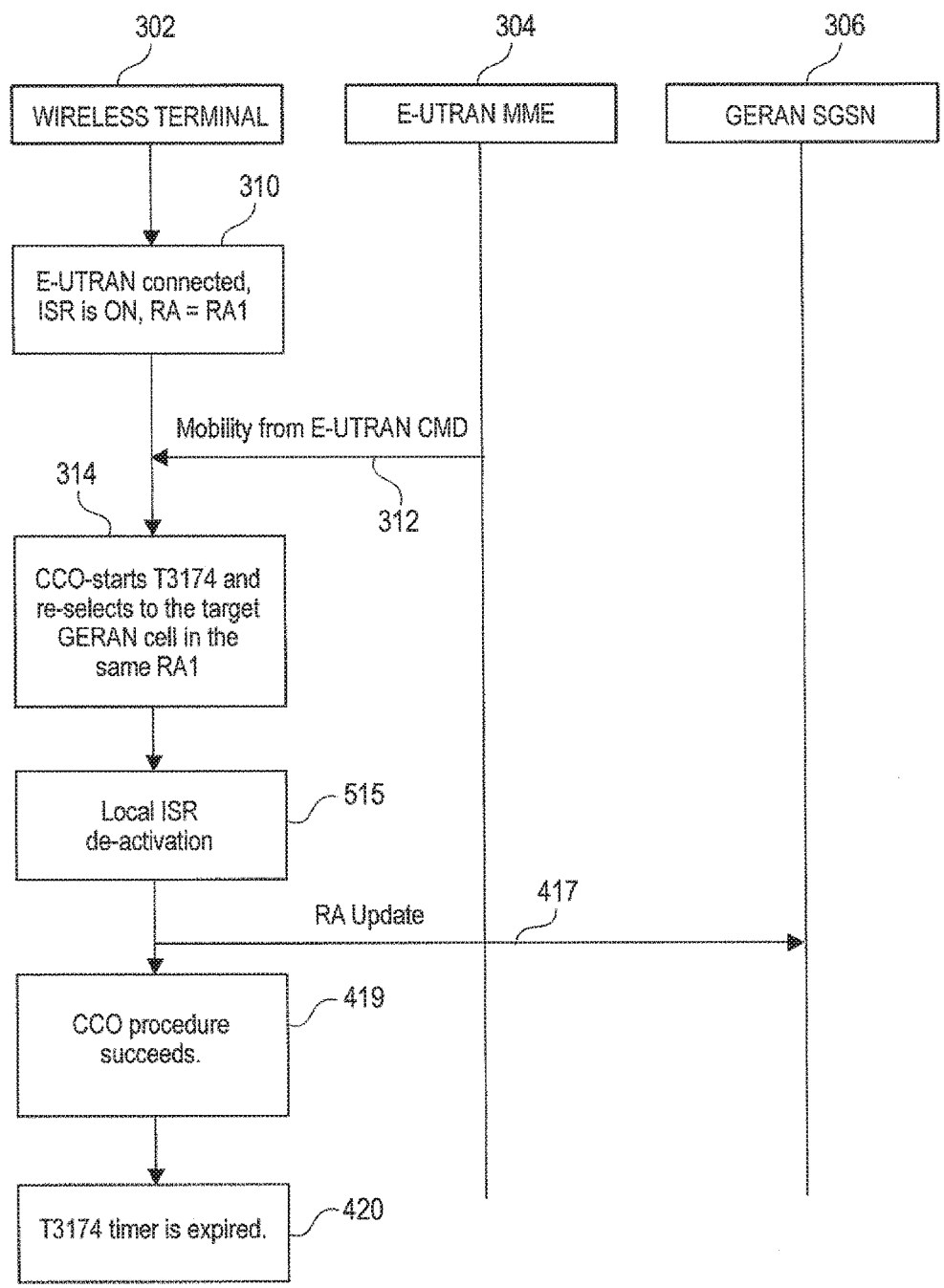
FIG. 5 is an event diagram showing operations performed by entities of an E-UTRAN network according to another embodiment.

Turning to FIG. 5, an event diagram, similar to that shown in FIG. 4, shows operations (represented by boxes) performed by entities (wireless terminal 302 for example a mobile terminal, E-UTRAN MME 304 and GERAN SGSN 306) wherein time is represented by a downward vertical direction (not to scale). One or more signals between entities are represented by horizontal arrows. In this example only one signal is shown and only operations performed by the wireless terminal are shown.

In box 310, the wireless terminal 302 is connected to the E-UTRAN MME by means of signalling that takes place between the wireless terminal and the E-UTRAN MME. As a result of this connection, the wireless terminal is in a connected state in which the wireless terminal can transmit and receive traffic data via the E-UTRAN node to which it is connected. The wireless terminal is considered to be in E-UTRAN connected mode. ISR is active or activated i.e. ON in the wireless terminal and therefore the wireless terminal is registered with both the E-UTRAN and the GERAN, the registration of the wireless terminal being associated with a registration area or cell by the E-UTRAN and also being associated with a registration area or cell by the GERAN. The GERAN associates the wireless terminal with a registration area 'RA1'.

As indicated by arrow 312, the wireless terminal receives a signal comprising an indication in the form of a message termed 'Mobility from E-UTRAN Command' having a 'purpose' parameter set to 'Cell Change Order' (CCO) and a target RAT type set to GERAN as specified in 3GPP TS36.331, s5.4.3.3. The message also indicates a target GERAN cell or RA (this being located within RA1).

In box 314, the wireless terminal starts the indicated CCO procedure and also starts a designated timer T3174 for CCO completion control and the terminal performs a reselection which serves to re-select the terminal to the target GERAN cell using the information provided in the 'Mobility from E-UTRAN Command' message. In this situation, the target GERAN cell is within the same RA1 with which the wireless terminal is associated by its registration (that is, the target GERAN cell is within the same routing area RA1 with which the wireless terminal is effectively registered).

In box 515, the wireless terminal locally deactivates ISR, in this example by setting its TIN to "GUTI", as soon as it successfully reselects to (i.e. camps on) the target GERAN cell.

The wireless terminal can deactivate ISR regardless of any pending uplink data or request. Alternatively the wireless terminal shall deactivate ISR provided that the registered RA is not changed (during the intersystem change from E-UTRAN to GERAN) and there is no pending uplink data or request.

De-activating the ISR function, when the RA is not changed and there is no pending uplink data or request, serves to overcome a problem that is caused by the situation in which the RA is not changed and there is no pending uplink data or request. As already outlined above it has now been recognized that, in this situation, there exists no trigger that would cause an initiation of an access to the target GERAN cell (Routing Area update request message for example) needed for the successful completion of the CCO (intersystem change).

As indicated by arrow 417, the wireless terminal then triggers a routing area update (RAU) procedure as a result of the intersystem (inter-RAT) change and as a result of the local ISR deactivation.

The wireless terminal can trigger RA update regardless of any pending uplink data or request. Alternatively the wireless terminal triggers RA update provided that the registered RA is not changed and there is no pending uplink data or request.

The wireless terminal triggering a routing area update, when the RA is not changed and there is no pending uplink data or request, serves to overcome a problem that is caused by the situation in which the RA is not changed and there is no pending uplink data or request. As already outlined above, it has now been recognized that in this situation there exists no trigger that would cause an initiation of an access to the target GERAN cell (Routing Area update request message for example) needed for the successful completion of the CCO (intersystem change).

In box 419, the CCO is successfully completed as the RAU by the mobile terminal completes the CCO procedure according to the requirements specified in TS44.060, s 8.4.1 which says:

"The mobile station shall regard the network controlled cell reselection procedure as successfully completed when it has performed access and successfully completed contention resolution in the new cell."

In box 420, the wireless terminal then stops the CCO completion control timer T3174.

If the CCO completion control timer T3174 expires after the mobile terminal has locally deactivated ISR but before CCO completion (access to GERAN with successful completed contention resolution in the new cell) then the wireless terminal cancels the local ISR deactivation by setting its TIN back to 'RAT related TMSI' before it goes back to the source E-UTRAN cell and initiates connection re-establishment as specified in TS36.331, s5.4.3.5.

The inventive features described above and illustrated by the accompanying drawings allow successful CCO completion in a situation in which a wireless terminal performs an intersystem change from a E-UTRAN-connected state to a GERAN cell by CCO, when ISR is active, within the same RA and there is no pending uplink data or request. This allows the wireless terminal to consistently and reliably succeed in performing the intersystem change in the above-described situation which would otherwise result in a failure and a negative user experience.

The inventive features serve to align a E-UTRAN to GERAN intersystem change via CCO in connected mode to a E-UTRAN to GERAN intersystem change via handover in connected mode since, according to the claimed inventive features, in each of these intersystem changes the wireless terminal will trigger a RA update after successful selection to GERAN, regardless of the ISR status. The level of alignment depends on whether the pending uplink data or request in CCO is considered or not.

It should be understood that the invention may be implemented in software and/or in hardware. If it is implemented in software, the software may be provided on a carrier medium such as, for example, CD ROM, electronic memory or a signal transmitted over a computer network. The software may be integrated with software or programming code for performing functions other that the functions relating directly to the claimed features. The software may not exist as a separate module and it may be integrated with an operating system for a computer or processor.

This application is based upon and claims the benefit of priority from United Kingdom patent application No. 1205827.7, filed on Mar. 30, 2012, the disclosure of which is incorporated in its entirety by reference.

INDUSTRIAL APPLICABILITY

The invention relates to intersystem change and in particular to an improved intersystem change of a wireless terminal between different radio access networks.

REFERENCE SIGNS LIST 102 eNB
106 MME/S-GW
108 MME/S-GW
202 EPC
206 MME
208 S-GW
302 wireless terminal
304 E-UTRAN MME
306 GERAN SGSN

The invention claimed is:
1. A method comprising:
receiving a mobility command from a first Radio Access Network (RAN),
performing a cell change order to a second RAN; and
deactivating, when a user equipment (UE) moves from the first RAN connected mode to the second RAN via the cell change order, an Idle mode Signaling Reduction (ISR) by setting a temporary identifier (TIN) to globally unique temporary identifier (GUTI) before initiating a routing area (RA) update procedure.
2. The method according to claim 1,
wherein the UE is configured to be registered with both a first apparatus via the first RAN and a second apparatus via the second RAN.
3. The method according to claim 1,
wherein the first RAN is Evolved Universal Terrestrial Radio Access Network (E-UTRAN) and the second RAN is GSM EDGE Radio Access Network (GERAN).

4. The method according to claim 1,
wherein the RA update procedure is initiated by an access trigger signal, the access trigger signal being a RAU (Routing Area Update) message.

5. The method according to claim 2,
wherein the first apparatus is Mobility Management Entity (MME), and
wherein the second apparatus is Serving GPRS Support Node (SGSN).

6. A user equipment (UE) comprising:
a receiver configured to receive a mobility command from a first Radio Access Network (RAN),
a processor configured to perform a cell change order to a second RAN,
wherein the processor configured to deactivate, when the UE moves from the first RAN connected mode to the second RAN via the cell change order, an Idle mode Signaling Reduction (ISR) by setting a temporary identifier (TIN) to globally unique temporary identifier (GUTI) before initiating a routing area (RA) update procedure.

7. The user equipment according to claim 6,
wherein the UE is configured to be registered with both a first apparatus via the first RAN and a second apparatus via the second RAN.

8. The user equipment according to claim 6,
wherein the first RAN is Evolved Universal Terrestrial Radio Access Network (E-UTRAN) and the second RAN is GSM EDGE Radio Access Network (GERAN).

9. The user equipment according to claim 6,
wherein the RA update procedure is initiated by an access trigger signal, the access trigger signal being a RAU (Routing Area Update) message.

10. The user equipment according to claim 7,
wherein the first apparatus is Mobility Management Entity (MME), and
wherein the second apparatus is Serving GPRS Support Node (SGSN).

* * * * *